US012123434B2

(12) United States Patent
Sahlman et al.

(10) Patent No.: US 12,123,434 B2
(45) Date of Patent: Oct. 22, 2024

(54) HYDRAULIC SYSTEM AND A METHOD FOR CONTROLLING THE SAME

(71) Applicants: Volvo Construction Equipment AB, Eskilstuna (SE); Norrhydro Oy, Rovaniemi (FI)

(72) Inventors: Mika Sahlman, Tampere (FI); Jussi Mäkitalo, Tampere (FI); Ari Lappalainen, Tampere (FI); Peter Stambro, Hawthorn Woods, IL (US)

(73) Assignee: Volvo Construction Equipment AB, Eskilstuna (SE)

( * ) Notice: Subject to any disclaimer, the term of this patent is extended or adjusted under 35 U.S.C. 154(b) by 27 days.

(21) Appl. No.: 17/602,291

(22) PCT Filed: Apr. 8, 2019

(86) PCT No.: PCT/EP2019/058832
§ 371 (c)(1),
(2) Date: Oct. 8, 2021

(87) PCT Pub. No.: WO2020/207555
PCT Pub. Date: Oct. 15, 2020

(65) Prior Publication Data

US 2022/0186750 A1 Jun. 16, 2022

(51) Int. Cl.
*F15B 11/04* (2006.01)
*F15B 1/02* (2006.01)

(52) U.S. Cl.
CPC .............. *F15B 11/04* (2013.01); *F15B 1/024* (2013.01); *F15B 2201/51* (2013.01);
(Continued)

(58) Field of Classification Search
CPC ...... F15B 11/04; F15B 1/024; F15B 2201/51; F15B 2201/515; F15B 2211/20546;
(Continued)

(56) References Cited

U.S. PATENT DOCUMENTS 7,823,379 B2 * 11/2010 Hamkins ............... F15B 11/006 60/414
8,087,733 B2 * 1/2012 Fouquet .................... B65F 3/00 303/10
(Continued)

FOREIGN PATENT DOCUMENTS

CN 101113597 A 1/2008
CN 102019842 A 4/2011
(Continued)

OTHER PUBLICATIONS

International Search Report and Written Opinion of the International Searching Authority, PCT/EP2019/058832, mailed Jan. 14, 2020, 13 pages.
(Continued)

*Primary Examiner* — Dustin T Nguyen
(74) *Attorney, Agent, or Firm* — Sage Patent Group

(57) ABSTRACT

A hydraulic system includes: a high-pressure line; a pump configured to supply pressurized hydraulic fluid to the high-pressure line; a variable displacement hydraulic machine connected by a fluid connection to the high-pressure line for rotationally driving the rotatable load; an electronic control unit; an energy storing device connected to the high-pressure line and configured to communicate with the high-pressure line by receiving energy from the high-pressure line and/or supplying energy to the high-pressure line; and a first detector configured to detect the amount of energy stored in the energy storing device and to transmit a signal indicating said amount of energy stored to the electronic control unit. The electronic control unit is configured to control the volume flow intake of the variable displacement hydraulic machine dependent on a target output of the variable displacement hydraulic machine and on
(Continued)

the detected amount of energy stored in the energy storing device.

19 Claims, 1 Drawing Sheet

(52) U.S. Cl.
CPC .................. *F15B 2201/515* (2013.01); *F15B 2211/20546* (2013.01); *F15B 2211/212* (2013.01); *F15B 2211/625* (2013.01); *F15B 2211/6309* (2013.01); *F15B 2211/6346* (2013.01); *F15B 2211/6654* (2013.01); *F15B 2211/6656* (2013.01); *F15B 2211/75* (2013.01); *F15B 2211/763* (2013.01)

(58) Field of Classification Search
CPC .......... F15B 2211/212; F15B 2211/625; F15B 2211/6309; F15B 2211/6346; F15B 2211/6654; F15B 2211/6656; F15B 2211/75; F15B 2211/763; F15B 2211/20515; F15B 2211/20538; F15B 2211/633; F15B 2211/6336
See application file for complete search history.

(56) References Cited

U.S. PATENT DOCUMENTS

| | | | | |
|---|---|---|---|---|
| 9,878,737 | B2 * | 1/2018 | McIlheran | B62D 5/065 |
| 9,963,855 | B2 * | 5/2018 | Jagoda | F16H 61/4096 |
| 10,407,036 | B2 * | 9/2019 | Okano | B60T 13/146 |
| 11,255,429 | B2 * | 2/2022 | Giorgio Bort | B60K 6/12 |
| 2013/0227939 | A1 * | 9/2013 | Hornberg | F15B 11/16<br>60/420 |
| 2014/0060018 | A1 * | 3/2014 | Ma | E02F 9/2296<br>60/327 |
| 2015/0368879 | A1 * | 12/2015 | Peterson | E02F 9/2242<br>60/413 |
| 2016/0244090 | A1 | 8/2016 | McIlheran et al. | |

FOREIGN PATENT DOCUMENTS

| | | | |
|---|---|---|---|
| CN | 102300754 | A | 12/2011 |
| CN | 104385915 | A | 3/2015 |
| CN | 104454715 | A | 3/2015 |
| CN | 104603372 | A | 5/2015 |
| CN | 107206988 | A | 9/2017 |
| DE | 102009053702 | A1 | 5/2011 |
| EP | 23636907 | A2 | 9/2013 |
| GB | 1312949 | A | 4/1973 |
| WO | 2013025416 | A2 | 2/2013 |

OTHER PUBLICATIONS

First Office Action and Search Report for Chinese Application No. 201980095177.5, mailed Dec. 8, 2023, 32 pages.
First Office Action for Korean Patent Application No. 10-2021-7036471, mailed Aug. 16, 2024, 6 pages.

* cited by examiner

HYDRAULIC SYSTEM AND A METHOD FOR CONTROLLING THE SAME

CROSS REFERENCE TO RELATED APPLICATIONS

This application is a 35 U.S.C. § 371 national stage application of PCT International Application No. PCT/EP2019/058832 filed on Apr. 8, 2019, the disclosure and content of which is incorporated by reference herein in its entirety.

FIELD OF THE INVENTION

The solution presented relates to a hydraulic system and a control system for the same. The solution presented also relates to a method for controlling the hydraulic system.

BACKGROUND OF THE INVENTION

Hydraulic systems apply hydraulic pressure accumulators for receiving and storing pressurized hydraulic fluid. Pressurized hydraulic fluid may be returned from the pressure accumulator to the hydraulic system, if needed. Consequently, a given amount of energy can be stored in the pressure accumulator, to be returned for use in the hydraulic system, for example to one or more hydraulic actuators, such as variable displacement hydraulic machines. A volume flow of hydraulic fluid can be conveyed from the pressure accumulator to the actuator which may be kept in motion by said volume flow from the pressure accumulator.

A predetermined maximum amount of hydraulic fluid may be stored in the pressure accumulator so that, for example, the movement of an actuator cannot be maintained indefinitely, because the pressure accumulator will be exhausted and normally its pressure will go down simultaneously. Running out of the volume flow of hydraulic fluid may result in such changes in the behaviour of the actuator that are uncontrollable or undesirable, such as an abrupt reduction in the speed of the actuator.

BRIEF SUMMARY OF THE INVENTION

It is thus an objective of the invention to provide a new hydraulic system for driving a rotatable load and a method for controlling a hydraulic system for driving a rotatable load. This objective is achieved by a method and system characterized by what is stated in the independent claims. Preferred embodiments are disclosed in the dependent claims.

According to an aspect, a hydraulic system for driving a rotatable load comprises: a high-pressure line for hydraulic fluid; a pump configured to supply pressurized hydraulic fluid to the high-pressure line; a variable displacement hydraulic machine connected by a fluid connection to the high-pressure line for rotationally driving the rotatable load; an electronic control unit; an energy storing device connected to the high-pressure line and configured to communicate with the high-pressure line by receiving energy from the high-pressure line and/or supplying energy to the high-pressure line; and a first detector configured to detect the amount of energy stored in the energy storing device and to transmit a signal indicating said amount of energy stored to the electronic control unit. The amount of energy may be detected continuously, at predetermined intervals, at predetermined measurement points or in other suitable manner. According to the aspect, the electronic control unit is configured to control the volume flow intake of the variable displacement hydraulic machine dependent on the target output of the variable displacement hydraulic machine and on the detected amount of energy stored in the energy storing device. The hydraulic system may also comprise a low-pressure line. The variable displacement hydraulic machine may be connected to both the high-pressure line and the low-pressure line.

According to another aspect, in a method for controlling a hydraulic system described in this application, a volume flow intake of a variable displacement hydraulic machine is controlled dependent on the target output of the variable displacement hydraulic machine and on the detected amount of energy stored in the energy storing device.

The system according to the solution presented may be applied in a hoisting device, such as a crane, which comprises a boom for lifting and transferring loads, or in a machine which may be used for lifting or transferring loads. Said boom may be configured to be movable, for instance rotated, by said system. Said boom may be provided in a mobile machine.

A mobile machine may be provided with a hydraulic system according to the solution. Such a hydraulic system may be configured to drive a rotatable load of the mobile machine, for instance to turn/rotate a boom of the mobile machine, to move the mobile machine by driving its moving equipment, such as wheels.

The hydraulic system according to the solution presented has the advantage of maximum utilization of the energy stored in the energy storing device, such as a pressure accumulator, avoiding an abrupt change in the output of the actuator, such as torque or speed, caused by exhaustion of the energy storing device.

DESCRIPTION OF THE DRAWINGS

The presented solution will be described in greater detail in the following, with reference to the accompanying drawings.

DETAILED DESCRIPTION OF THE INVENTION

Figure 1:
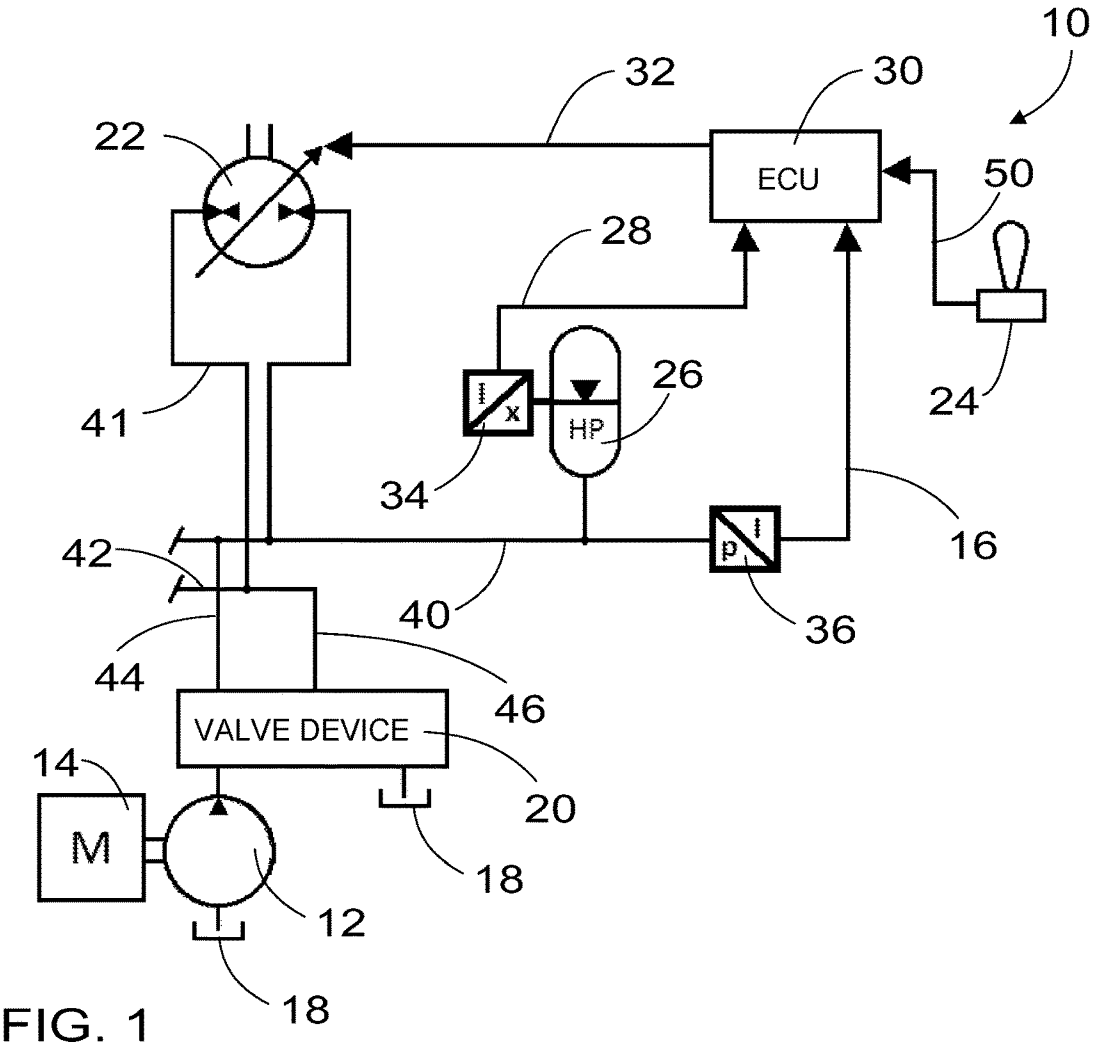
FIG. 1 shows a principle of implementing a hydraulic system and its control system, in which the solution presented can be applied.

FIG. 1 shows an example of a hydraulic system and control system for controlling it, in which example the solution presented may be applied. It is clear for a person skilled in the art that this is an example only, that not all the features shown in FIG. 1, such as the setting device, are needed to implement the solution, and that, on the other hand, the hydraulic system may comprise other features or features different from the hydraulic system of FIG. 1.

The hydraulic system according to the solution presented, and its control system, in other words a system 10, comprises a high-pressure line 40 and at least one variable displacement hydraulic machine 22. The hydraulic system and its control system also comprise at least one energy storing device 26, such as a hydraulic pressure accumulator, connected to the high-pressure line 40 and configured to communicate with the high-pressure line 40 by receiving energy from the high-pressure line 40 and/or supplying energy to the high-pressure line 40. The hydraulic system and its control system further comprise at least one first detector 34, 36, at least one hydraulic pump 12 configured to supply pressurized hydraulic fluid to the high-pressure line 40, and an electronic control unit 30. The at least one first detector 34, 36 is configured to detect the amount of energy stored in the energy storing device 26 and to transmit a signal indicating said amount of energy stored to the electronic control unit 30. The amount of energy may be detected continuously, at predetermined intervals, at predetermined measurement points or in other suitable manner. The hydraulic system 10 may further comprise a low-pressure line 41.

The variable displacement hydraulic machine 22 is connected by a fluid connection to the high-pressure line 40 and, in some embodiments, also to a low-pressure line 41 for rotationally driving the rotatable load. The fluid connection refers to a connection capable of communicating fluid, such as hydraulic fluid, from the high-pressure line 40 and, in some embodiments, such as the embodiment of FIG. 1, from the low-pressure line 41 to the variable displacement hydraulic machine 22 and vice versa. The variable displacement hydraulic machine 22 may comprise a variable displacement actuator suitable for driving a rotatable load (not shown). The variable displacement hydraulic machine 22 may comprise for instance a variable displacement motor, a variable displacement pump or a variable displacement pump/motor.

The variable displacement hydraulic machine 22 may be configured to drive a rotatable load (not shown) to which the variable displacement hydraulic machine applies a torque, which is dependent on pressure difference over the variable displacement hydraulic machine 22 and displacement setting of the variable displacement hydraulic machine 22. Volume flow intake of the variable displacement hydraulic machine 22 depends on the displacement setting and rotational speed.

The variable displacement hydraulic machine 22 may be connected to the high-pressure line 40 and low-pressure line 41 for hydraulic fluid. The pressure lines 40, 41 may, thus, communicate pressurized hydraulic fluid to and from the variable displacement hydraulic machine 22. In some embodiments, valve devices may also be connected to the pressure lines 40, 41 for limiting the pressure of hydraulic fluid in the respective pressure line(s) 40, 41 to a predetermined maximum value, for example.

The variable displacement hydraulic machine 22 may be irreversible or reversible. The displacement of a reversible variable displacement hydraulic machine 22, such as an over-center variable displacement pump, may be adjusted via zero on to the negative side. The variable displacement hydraulic machine 22 may typically be used both as a pump and a motor. Both irreversible and reversible variable displacement hydraulic machines are known in the art and are not explained in more detail.

The pump 12 is configured to supply pressurized hydraulic fluid to the high-pressure line 40. The pump 12 may be connected to the high-pressure line 40 via, for example, a third pressure line 44. The maximum volume flow and the maximum pressure of the hydraulic fluid produced by the pump 12 will depend on the sizing of the pump 12.

In different embodiments, the pump 12 may be of a fixed volume type or preferably an adjustable-displacement pump, also called variable displacement pump, whereby the volume flow produced by the pump 12 can be adjusted, for example, within limits set by predetermined minimum and maximum values. The pump 12 is rotated by a motor 14. The motor 14 may be, for example, an electric motor or a combustion engine.

The pump 12 is supplied with hydraulic fluid from, for example, a tank 18 for hydraulic fluid. The tank 18 may be vented to atmosphere.

The hydraulic fluid is returned from the variable displacement hydraulic machine 22 to, for example, a fourth pressure line 42, in which the pressure of the hydraulic fluid is lower than in the high-pressure line 40. The pressure line 42 may also be used as a tank line, via which the hydraulic fluid returning from the variable displacement hydraulic machine 22 will flow into the tank 18. The tank 18 may be connected to the low-pressure line 41 via, for example, a fifth pressure line 46.

The system 10 may comprise a valve device 20 by which the access and flow of hydraulic fluid from the pump 12 to the high-pressure line 40, and vice versa, can be controlled. The valve device 20 may be placed, for example, in the line 44. The valve device 20 may also be configured to control the access and flow of hydraulic fluid from the high-pressure line 40 to the tank 18. The valve device 20 may comprise one or more control valves.

According to an embodiment, a valve device (not shown) may also be provided to control the flow of hydraulic fluid from the high-pressure line 40 to the variable displacement hydraulic machine 22. According to another embodiment, the valve device may also be configured to close the connection and the volume flow between the high-pressure line 40 and the variable displacement hydraulic machine For adjusting the volume flow, such a valve device is preferably electronically controllable.

The valve device (not shown) may be controlled by an electronic control unit 30 which may comprise, for example, one or more electronic control cards for controlling the valve device. The function of the control unit 30 may, in such embodiments, be to generate a control signal, for example a current signal, for controlling the valve device.

However, such a valve device for controlling the flow of hydraulic fluid from the high-pressure line 40 to the variable displacement hydraulic machine 22 is not necessary in the solution described in this this description. This is actually one advantage of the solution. Despite of that, such a valve device might, thus, be used in some embodiments.

The control unit 30 is preferably a programmable microprocessor based device which runs one or more control algorithms stored in its memory and performing computing and logic functions. The control unit 30 comprises an interface for connecting, for example, signals generated by detectors, such as sensors, and control devices, and for connecting control signals generated in the control unit 30. Control algorithms may produce, for example on the basis of signals, a predetermined control signal continuously, at predetermined intervals or in other suitable manner. The control unit 30 may be provided with user interface devices for controlling the operation of the control unit 30. The control unit 30 may be based on a programmable logic or a computer operated under control of a control program or a user. The control unit 30 may consist of one or several separate devices, or it may constitute a distributed system whose different parts or devices are connected to each other or communicate with each other. According to an embodiment, also other functions of the system 10 may be monitored and controlled by the control unit 30 besides the control described in this description.

A control signal 32 may be dependent on, for example, the rotational speed of the variable displacement hydraulic machine 22, the amount of energy stored in the energy storing device 26, target rotational speed, such as signal 50, and/or the volume flow available/supplied by the pump for the variable displacement hydraulic machine 22. The target rotational speed may refer to the target rotational speed of the variable displacement hydraulic machine and/or the rotatable load driven by it. The volume flow available/supplied by the pump for the variable displacement hydraulic machine 22 refers to the volume flow available for the variable displacement hydraulic machine 22 in question and it might be different from the total volume flow generated by the pump 12, for instance if other actuators, hydraulic machines and/or hydraulic systems are connected to the pump, for instance via a further pressure line, such as the fourth pressure line 42.

In generating the control signal 32, a controller may be applied, such as a P controller or a PID controller, which is implemented in the control unit 30 and is based on, for example, torque feedback, speed feedback or rotational speed feedback. For the control, the system 10 may comprise detectors, such as sensor devices, for measuring the rotational speed of the variable displacement hydraulic machine 22 and/or a (rotational) speed of the rotatable load driven by the variable displacement hydraulic machine 22 and for transmitting said measurement signal to the control unit 30.

The system 10 may also comprise one or more control devices 24 connected to the control unit 30 for the purpose of controlling the system 10, for example the variable displacement hydraulic machine 22 therein. The control device 24 may be, for example, manually controllable, in one example a control stick. The control stick is operated by a user. The control device 24 may be configured to generate a setting signal 50 dependent on the position of the control device 24, for example the inclination of the control stick. Said setting signal 50 may be used as an input in the control unit 30.

Alternatively, said setting signal 50 can be input with input devices, which may include, for example, the control unit 30 or a part of it, a device connected to the control unit 30, or the above described control device 24. In the control unit 30, the setting signal 50 may be input manually by user interface devices of the control unit 30, or it may be generated by software by running control algorithms for influencing the variable displacement hydraulic machine 22, such as the rotational speed and/or the displacement of the variable displacement hydraulic machine.

In an embodiment, the control device 24 may be used to control the rotational speed of the variable displacement hydraulic machine 22 and/or the speed of the rotatable load driven by the variable displacement hydraulic machine, so that the (rotational) speed of the variable displacement hydraulic machine 22 or the rotatable load is different in different positions of the control device 24 or control stick. The desired (rotational) speed of the variable displacement hydraulic machine 22 or the rotatable load may be proportional to the position of the control device 24 or control stick. The control algorithm of the control unit 30 may be configured to control for instance the displacement of the variable displacement hydraulic machine 22 on the basis of the setting signal 50 so that the desired (rotational) speed, in other words a target (rotational) speed, of the variable displacement hydraulic machine 22 or the rotatable load driven by it is achieved.

The energy storing device 26 is connected to the high-pressure line 40, from which the energy storing device received hydraulic energy to be stored in the energy storing device 26 in hydraulic form or in another energy form and to which the energy storing device 26 may supply hydraulic energy.

According to an embodiment, the energy storing device 26 may comprise a pressure accumulator. In such an embodiment, the energy storing device 26 may receive pressurized hydraulic fluid from the high-pressure line 40 and give pressurized hydraulic fluid to the high-pressure line 40. Such a pressure accumulator 26 has a predetermined effective volume based on its sizing and proportional to the maximum quantity of hydraulic fluid that can be supplied from the pressure accumulator 26 to the high-pressure line 40, for example within a given period of time.

The pressure accumulator may be a weight loaded accumulator, a spring loaded accumulator, or preferably a gas loaded accumulator. The type of said gas loaded accumulator is a bladder accumulator or a membrane accumulator, or preferably a piston accumulator. It is typical of a gas loaded accumulator that the pressure of the hydraulic fluid contained in it decreases as the amount of said hydraulic fluid decreases.

If necessary, on the basis of the above mentioned dependence, the amount of energy stored in the energy storing device 26, which in this case is the amount of hydraulic fluid in the pressure accumulator, can be estimated by measuring the pressure of said hydraulic fluid, for example, in the line to which the energy storing device 26 is connected, such as the high-pressure line 40.

For charging, the pressure accumulator can be supplied with pressurized hydraulic fluid. The pressure accumulator is sized, for example, to receive hydraulic fluid when the pressure of the high-pressure line 40 is equal to or higher than a predetermined minimum pressure. The sizing of a gas loaded accumulator is based on e.g. the pre-charge pressure of the gas used in the pressure accumulator. Said minimum pressure is selected to be for instance lower than the pressure prevailing in the high-pressure line 40, for example, when a rotatable load is driven by the variable displacement hydraulic machine 22 or when the variable displacement hydraulic machine 22 is at rest.

According to another embodiment, the energy storing device 26 may comprise an energy storing device storing energy in another energy form, such as electric energy. Such an energy storing device 26 may comprise for instance an electric battery or a like. Also in such embodiments, the amount of energy stored in the energy storing device 26 may be estimated by measuring the pressure of hydraulic fluid in the high-pressure line 40.

The high-pressure line 40 may be provided with a first detector 36 configured to measure the pressure of the hydraulic fluid contained in the high-pressure line 40. The system 10 may also comprise other detectors which measure the pressure of the hydraulic fluid and are connected to the control unit 30, for example for measuring the pressure in the low-pressure line 41.

The first detector 36 may generate a measurement signal 16 which is, for example, electronic. The measurement signal 16 may indicate the measured pressure for instance by being proportional to the measured pressure. The signal is, for example, a current signal. The first detector 36 may be connected to the control unit 30 for transmitting the measurement signal 16 to the control unit 30 where the measurement signal 16 is an input for a control algorithm.

On the basis of the measurement signal 16 generated by the first detector 36, the amount of energy stored in the energy storing device 26, such as the amount of hydraulic fluid in the pressure accumulator, can be measured indirectly by measuring the pressure in the high-pressure line 40. The control unit 30 may be configured to deduce the amount of energy stored in the energy storing device from for instance the properties of the energy storing device 26 and said pressure. In said deduction, the control unit 30 may take into account, for example, the known behaviour of changes, e.g. an adiabatic change, in the pre-charge pressure or in the volume of the gas in the energy storing device 26. In the energy storing device 26, such as the pressure accumulator, the pressure of the gas may follow the pressure of the hydraulic fluid which, in turn, tends to follow the pressure in the high-pressure line 40, and the volume of the gas, in turn, is dependent on the pressure of the gas.

In an alternative of the solution presented, the system 10 comprises a first detector 34 connected to the energy storing device 26 and configured to measure the amount of energy stored in the energy storing device 26, either directly or indirectly. The first detector 34 may be configured to measure the amount of energy stored for instance indirectly, based on the measured position of a moving part of the pressure accumulator, dependent on the amount of hydraulic fluid. Said part may be, for example, the bladder of a bladder accumulator, the membrane of a membrane accumulator, or preferably the piston of a piston accumulator. The operation of the first detector 34 may be based on touchless measurement, a linear sensor, or a cable traction device, for example.

The first detector 34 generates a measurement signal 28 which is, for example, electronic, the measurement signal 28 being indicative of the amount of energy stored in the energy storing device, such as the amount of hydraulic fluid in the pressure accumulator, or the above mentioned measured position. The signal may be, for example, a current signal. The first detector 34 may be connected to the control unit 30 for transmitting the measurement signal 28 to the control unit 30 where the measurement signal 28 may be used as an input for a control algorithm. Either the first detector 34 or the control unit 30 and its control algorithm may deduce the amount of energy stored in the energy storing device 26, dependent on said measured position.

With the first detector 34, a precise measurement signal 28 can be achieved in a simple way, when uncertainties relating to the measurement of the pressure and the behaviour of the gas are to be avoided.

The energy storing device 26 and the pump 12 are configured to supply hydraulic fluid to the variable displacement hydraulic machine 22 via the high-pressure line 40, for driving the variable displacement hydraulic machine 22. The volume flow of the hydraulic fluid is thus, according to a first example, sized to be sufficient to drive at least the variable displacement hydraulic machine 22 and also a rotatable load, if necessary. The magnitude of the rotatable load may be different or vary in different situations, whereby the torque needed for driving it may vary. When the full amount of volume flow provided to the high-pressure line 40 is not needed for driving the rotatable load, the pressure in the high-pressure line 40 may increase to a maximum value set for the high-pressure line 40, and the energy storing device 26 may be charged with pressurized hydraulic fluid.

The maximum overall volume flow produced by the energy storing device 26 and the pump 12 will determine the maximum volume flow intake or maximum speed of the variable displacement hydraulic machine 22, because the volume flow represents the quantity of hydraulic fluid flowing per time unit. In the solution presented, the maximum volume flow produced by the pump 12 is lower than said maximum overall volume flow. In an example, the maximum volume flow produced by the pump 12 is 80%, 60%, 40%, or 20% of said maximum overall volume flow, or lower.

The energy storing device 26 may reach a state in which the total amount of energy stored, such as the total amount of hydraulic fluid in it, is lower than the quantity of energy needed to supply a sufficient amount of hydraulic fluid from the energy storing device 26 to the variable displacement hydraulic machine 22 for driving the variable displacement hydraulic machine 22 to produce an output, such as for driving the rotatable load at a desired or predetermined (rotational) desired speed under control of for example, the setting signal 50.

In the presented solution, the maximum volume flow produced by the pump 12 may be sized to be lower than the volume flow of hydraulic fluid to be supplied from the high-pressure line 40 to the variable displacement hydraulic machine 22 for driving the variable displacement hydraulic machine 22 to provide the maximum output, such as to drive the variable displacement hydraulic machine 22 and/or the rotatable load at the maximum (rotational) speed and/or to provide the maximum torque. In an example, the maximum volume flow produced by the pump 12 is configured to generate 80%, 60%, 40%, or 20% of said maximum speed, or less.

The system 10 may be in the above described situation in which the total amount of energy stored in the energy storing device 26 is not sufficient for the entire desired output of the variable displacement hydraulic machine 22. Thus, as the energy storing device 26 is being exhausted, the rotational speed of the variable displacement hydraulic machine 22 is at risk to fall down from the desired rotational speed in an abrupt and uncontrolled manner, after which the movement of the variable displacement hydraulic machine 22 will be continued at a rotational speed dependent on the volume flow produced by the pump 12.

In the presented solution, the aim is to avoid the above described problem.

In the presented solution, the amount of energy stored in the energy storing device 26 is monitored by the control unit 30, by utilizing the first detector 34 and/or 36 as described above.

The control unit 30 is, under control of a control algorithm, configured to control the displacement of the variable displacement hydraulic machine 22 dependent on the target output of the variable displacement hydraulic machine 22 and on the detected amount of energy stored in the energy storing device. More particularly, the control unit 30 is configured control the displacement of the variable displacement hydraulic machine 22 by determining and/or calculating if the volume flow intake of the variable displacement hydraulic machine 22 has to be adjusted and how much it has to be adjusted. In other words, the control unit 30 may be configured to control displacement of the variable displacement hydraulic machine 22 by calculating if the volume flow intake of the variable displacement hydraulic machine 22 has to be limited because of the amount of energy available, that is currently stored, in the energy storing device 26. Thereby, the energy storing device running empty abruptly and the undesired consequences thereof to the operation of the variable displacement hydraulic machine 22 and the hydraulic system 10 as a whole can be avoided. The target output may comprise the torque provided by the variable displacement hydraulic machine 22, for example.

The control of the volume flow intake of the variable displacement hydraulic machine 22 may be implemented by controlling the displacement of the variable displacement hydraulic machine 22. By controlling the displacement, the maximum volume flow intake of the variable displacement hydraulic machine 22 can be controlled to a maximum variable displacement hydraulic machine volume flow value. Consequently, the maximum variable displacement hydraulic machine volume flow intake can be controlled to have only such a value or magnitude that, at its highest, is equal to or lower than a maximum value the pump 12 can supply for said variable displacement hydraulic machine 22.

As the adjustment is only based on the amount of energy stored in the energy storing device 26, a simple operation is achieved, in terms of the control.

When the above described adjustment is in use, the setting signal 50 cannot be used to adjust the output of the variable displacement hydraulic machine 22 to a value that exceeds the maximum value. The control unit 30 controls the displacement in such a way that the control signal 32 generated by the control unit 30 and the control algorithm is now dependent on not only the setting signal 50 but also the amount of energy stored in the energy storing device 26. The amount of energy stored in the energy storing device 26, in turn, is measured by the first detector 34 and/or the 36.

If the system 10 comprises the control device 24, a predetermined position of the control device 24 will generate a predetermined setting signal 50. Thus, when the above described adjustment is in use, a given position of the control device 24 will result in such an output of the variable displacement hydraulic machine 22 that may be lower than the output resulting from the same position in a situation in which the above described adjustment is not in use. In such a situation, the user of the control device 24 will detect a deceleration of the variable displacement hydraulic machine 22 even if the user would not change the position of the control device 24.

By means of the above described control of the volume flow intake of the variable displacement hydraulic machine, it is possible to control the changing of the output of the variable displacement hydraulic machine 22, whereby an abrupt and uncontrolled drop in the output, as described above, is avoided.

According to an embodiment, the control of the volume flow intake of the variable displacement hydraulic machine 22 may be controlled dependent on the amount of energy stored in the energy storing device only within a specific rotational speed range of the variable displacement hydraulic machine 22.

The volume flow supplied by the energy storing device 26 to the variable displacement hydraulic machine 22 will depend on the sizing of the connections, and the high-pressure line 40. In the above described method, when the adjustment is not in use, the rotational speed and the displacement of the variable displacement hydraulic machine 22 may be controlled on the basis of the desired output of the variable displacement hydraulic machine 22 and the setting signal 50. When the adjustment is to be taken into use, the displacement is adjusted to limit the volume flow to the variable displacement hydraulic machine 22. This may be used to limit the amount of energy taken from the energy storing device and, eventually when it has run out completely, to adjust to the maximum volume flow supplied by the pump 12 to the variable displacement hydraulic machine 22 in question.

According to an embodiment, the electronic control unit 30 may be configured to control the volume flow intake of the variable displacement hydraulic machine 22 by controlling said volume flow when the amount of energy stored in the energy storing device is equal to or lower than a predetermined limit value.

According to an embodiment, the pump 12 may be configured to supply a predetermined maximum pump volume flow intake of the variable displacement hydraulic machine 22; and the electronic control unit 30 may be configured to adjust the volume flow to the variable displacement hydraulic machine 22 to be, at its lowest, equal to a predetermined maximum variable displacement hydraulic machine volume flow which is proportional to the maximum pump volume flow intake of the variable displacement hydraulic machine. This maximum pump volume flow intake of the variable displacement hydraulic machine may be predetermined to be lower than the maximum volume flow provided by the pump 12, for instance in case several actuators and/or hydraulic machines are driven by the same pump 12.

According to an embodiment, controlling of the volume flow intake of the variable displacement hydraulic machine 22 may comprise controlling the volume flow intake of the variable displacement hydraulic machine to a predetermined maximum variable displacement hydraulic machine volume flow and the maximum variable displacement hydraulic machine volume flow may be the lower, the lower said amount of energy stored in the energy storing device 26 is.

According to an embodiment, the displacement of the variable displacement hydraulic machine 22 may be controlled to be the lower, the higher the rotational speed of the variable displacement hydraulic machine is.

According to an embodiment, the energy storing device 26 may comprise a pressure accumulator. In such an embodiment, receiving energy from the high-pressure line 40 may comprise receiving pressurized hydraulic fluid from the high-pressure line 40 into the pressure accumulator, and supplying energy to the high-pressure line 40 may comprise supplying pressurized hydraulic fluid to the high-pressure line 40.

According to an embodiment, the hydraulic system may comprise a valve device (not shown) configured to control the flow of pressurized hydraulic fluid from the high-pressure line 40 to the variable displacement hydraulic machine 22. According to an embodiment, the hydraulic system may comprise a valve device (not shown) configured to control the rotational speed of the variable displacement hydraulic machine. According to a further embodiment, one of these valve devices may comprise an internal valve device of the variable displacement hydraulic machine and/or an external valve device.

According to an embodiment, the hydraulic system further comprises at least one setting device configured to generate a setting signal and wherein the electronic control unit is configured to determine the target output of the variable displacement hydraulic machine dependent on the setting signal. According to a further embodiment, the at least one setting device may comprise a control device which is a manually controllable control stick.

According to an embodiment, the first detector 36 comprises a sensor configured to measure the amount of energy stored in the energy storing device indirectly. According to an embodiment, the first detector 36 is a sensor of a type configured to measure the pressure of hydraulic fluid contained in the pressure line, and is configured to transmit a measurement signal indicative of said pressure of the hydraulic fluid, to the electronic control unit 30 of the system 10. The pressure may be measured continuously, at predetermined intervals, at predetermined measurement points or in other suitable manner.

According to an embodiment, the first detector 34 comprises a sensor configured to measure the amount of energy stored in the energy storing device directly. According to an embodiment, the energy storing device comprises a pressure accumulator and wherein the first detector 34 is a sensor of a type connected to the pressure accumulator and configured to measure the amount of hydraulic fluid in the pressure accumulator, and is configured to transmit a measurement signal indicative of said amount of the hydraulic fluid, to the electronic control unit 30 of the system 10. The measurement may be configured to be implemented continuously, at predetermined intervals, at predetermined measurement points or in other suitable manner.

According to an embodiment, the at least one setting device comprises a control device 24 connected to the electronic control unit 30, configured to generate a setting signal, and configured to set a control signal to be indicative of the position of the control device 24.

According to an embodiment, the pump 12 is configured to produce a volume flow controlled to a predetermined maximum volume flow of the pump.

According to an embodiment, the energy storing device 26 comprises a pressure accumulator and the electronic control unit 30 is configured to control the volume flow intake of the variable displacement hydraulic machine 22 to a maximum variable displacement hydraulic machine volume flow, which is dependent of both the amount of the pressurized hydraulic fluid in the pressure accumulator and the pressure of the pressurized hydraulic fluid in the pressure accumulator. According to a further embodiment, the electronic control unit 30 is configured to control the volume flow intake of the variable displacement hydraulic machine 22 to a maximum variable displacement hydraulic machine volume flow dependent on the amount and pressure of pressurized fluid in the pressure accumulator, and also dependent on the power intake by the variable displacement hydraulic machine.

According to an embodiment, the electronic control unit may be configured to control the volume flow intake of the variable displacement hydraulic machine 22 dependent on the target output of the variable displacement hydraulic machine and on the detected amount of energy stored in the energy storing device. In more detail, such control may comprise at least three control situations depending on the energy stored in the energy storing device 26. Firstly, when the amount of energy stored in the energy storing device exceeds an upper control limit Eup of the amount of energy stored in the energy storing device 26, the volume flow intake of the variable displacement hydraulic machine may be controlled dependent on the target output of the variable displacement hydraulic machine only. Secondly, when the amount of energy stored in the energy storing device 26 goes below a lower control limit Elow of the amount of energy stored in the energy storing device, the volume flow intake of the variable displacement hydraulic machine may be controlled to be adjusted to the volume flow supplied by the pump to the variable displacement hydraulic machine. And thirdly, when the amount of energy stored in the energy storing device goes below the upper control limit Eup of the amount of energy stored in the energy storing device but exceeds the lower control limit Elow of the amount of energy stored in the energy storing device, the volume flow intake of the variable displacement hydraulic machine may be controlled dependent on the target output of the variable displacement hydraulic machine and the detected amount of energy stored in the energy storing device, such that the volume flow to the variable displacement pump exceeds the volume flow supplied by the pump to the variable displacement hydraulic machine by an amount dependent on the amount of energy stored in the energy storing means. According to a further embodiment, a dependency between the volume flow intake of the variable displacement hydraulic machine 22 and the amount of energy stored in the energy storing device may be linear, when the amount of energy stored in the energy storing device goes below the upper control limit Eup of the amount of energy stored in the energy storing device but exceeds the lower control limit Elow of the amount of energy stored in the energy storing device. According to a yet further embodiment, the dependency between the volume flow intake of the variable displacement hydraulic machine 22 and the amount of energy stored in the energy storing device may be monotonically dependent in a non-linear way, when the amount of energy stored in the energy storing device goes below the upper control limit Eup of the amount of energy stored in the energy storing device but exceeds a lower control limit Elow of the amount of energy stored in the energy storing device.

According to an embodiment, the hydraulic system 10 may comprise a second detector (not shown) configured to detect the actual output of the variable displacement hydraulic machine. The electronic control unit 30 may be configured to determine the difference between the actual output of the variable displacement hydraulic machine 22 and the target output of the variable displacement hydraulic machine and to control the volume flow intake of the variable displacement hydraulic machine also dependent of the determined difference. The target output of the variable displacement hydraulic machine 22 may be determined for instance on the basis of the setting signal 50.

According to an embodiment, the hydraulic system 10 may comprises a tank 18. According to another embodiment, the hydraulic system 10 may be configured to operate the rotatable load in a closed circuit.

According to an embodiment, the above described control of the volume flow intake of the variable displacement hydraulic machine may be applied as a method when the amount of hydraulic fluid in the energy storing device 26 has dropped to a value equal to or lower than an upper control limit Eup value.

According to an embodiment, the lower control limit Elow has a value for the amount of hydraulic fluid in the energy storing device 26 in the range of 0 to 15%, such as a value of 0%, 1%, 3%, 5%, 10%, or 15%, of the useful capacity of the energy storing device 26, or of the maximum amount of hydraulic fluid which can be supplied from the energy storing device 26.

According to an embodiment, the upper control limit Eup has a value for the amount of hydraulic fluid in the energy storing device 26 in the range of 3% to 25%, such as a value of 3%, 5%, 10%, 15%, 20%, or 25%, of the useful capacity of the energy storing device 26, or of the maximum amount of hydraulic fluid which can be supplied from the energy storing device 26. According to an embodiment, the upper control limit has a value for the amount of hydraulic fluid in the energy storing device 26 that is 3 to 25 percentage points higher than the lower control limit Elow.

According to an embodiment, and in addition to what has been described above, the control unit 30 may be, under control of a control algorithm, configured to adjust the maximum rotational speed of the variable displacement hydraulic machine 22, at its lowest, to a maximum value proportional to the volume flow produced by the pump 12, for example, equal to or lower than the maximum volume flow produced by the pump 12. Or more particularly, the displacement of the variable displacement hydraulic machine 22 may be adjusted to be reduced and that may lead to reduction in torque, which in turn may lead to reduction in the rotational speed.

The above described dependency may be based on a function based on the amount of energy stored, and/or hydraulic fluid, in the energy storing device 26, or it may be linearly declining or following the shape of a declining curve, in view of said amount of energy or hydraulic fluid stored in the energy storing device being decreasing.

Figure 2:
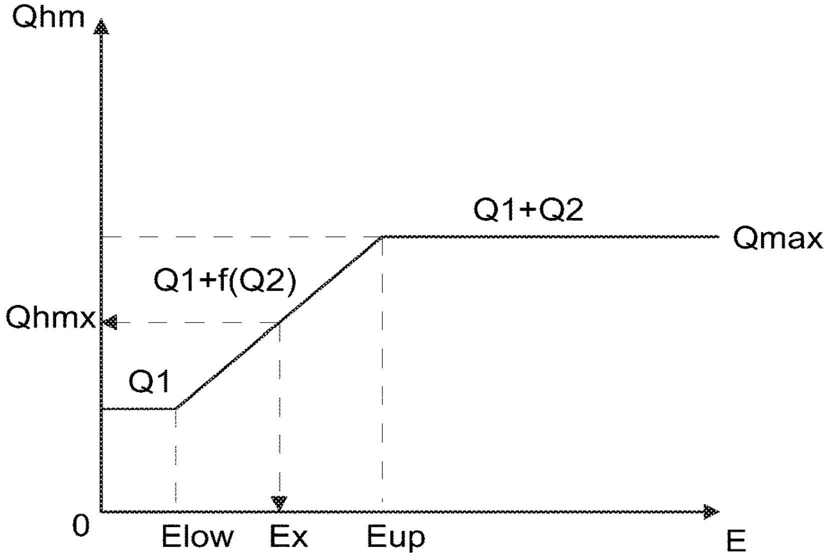
FIG. 2 shows a principle of controlling the volume flow intake Qhm of the variable displacement hydraulic machine of the system of FIG. 1, and an embodiment of controlling the maximum volume flow intake Qmax of the variable displacement hydraulic machine dependent of the amount E of energy stored in the energy storing device of the system.

FIG. 2 illustrates, with an example, the control of the volume flow Qhm to the variable displacement hydraulic machine 22 in the system 10, and the determination of the maximum volume flow Qmax set for it, based on the amount E of energy stored in the energy storing device 26.

In the example of FIG. 2, the above described dependency is linear at one range, namely within the range described by function Q1+f(Q2); in other words, it is based on a function. Said dependency or proportionality may also be based on a function which is not linear. When the amount E of energy stored has a value Ex, according to the presented solution it can be deduced that the volume flow Qhm of the variable displacement hydraulic machine 22 has a maximum value Qhmx. Thus, in such a range, also such volume flows of the variable displacement hydraulic machine 22 are allowable which are lower than the set maximum value.

In the example of FIG. 2, it is also implemented that the above described adjustment is applied as a method when the amount of energy stored in the energy storing device 22 has decreased to a level equal to or lower than the upper control limit Eup. When the adjustment is not in use, as within the range Q1+Q2, the maximum volume flow value Qmax will be determined, at its maximum, according to the overall volume flow supplied by the pump 12 and the energy storing device 26 to the variable displacement hydraulic machine in combination. Thus, in such a range, also such volume flows of the variable displacement hydraulic machine 22 are allowable which are lower than the set maximum value.

In the example of FIG. 2, after the amount of energy stored in the energy storing device 22 has decreased below the lower control limit Elow, which may comprise a predetermined level of energy stored or the energy stored in the energy storing device being used up, the above described adjustment is also implemented so that the maximum volume flow intake of the variable displacement hydraulic machine 22 is adjusted, at its lowest, to a maximum value proportional to the maximum volume flow produced by the pump 12 (see range where Qhm is equal to Q1). In this range, also such volume flows of the variable displacement hydraulic machine 22 are allowable which are lower than the set maximum value. In this case, said volume flows are only based on the volume flow produced by the pump 12.

In the example of FIG. 2, the symbol Q1 represents the maximum volume flow produced by the pump 12, and the symbol Q2 represents the volume flow produced by the energy storing device 26 and supplied to the variable displacement hydraulic machine 22.

The above described hydraulic system and its control system may be applied in various hoisting devices, such as cranes, for lifting and/or moving loads. For this, the hoisting device may be equipped with a boom, The boom may also comprise a boom of a forklift or similar type of a hoisting device. The above presented variable displacement hydraulic machine 22 may be a variable displacement hydraulic machine, for rotating the boom, transfer boom or hoisting boom, or a part thereof, whereby the above presented rotatable load may be the boom, transfer boom or hoisting boom or a part thereof either alone or in combination with a load carried by the boom, transfer boom or hoisting boom. The above presented variable displacement hydraulic machine 22 may also be configured to swing a machine structure or implement a travel function of a mobile machine. The above presented hoisting device and/or hydraulic system and its control system may be applied in various machines which may be used for hoisting or moving loads, and which may be self-propelled machines, in other words mobile machines, controlled by a user. Such a machine may be a forestry machine, such as a forwarder or a felling machine, an excavating machine, or an earth moving machine.

According to an embodiment, in the system described above, the target output, such as the torque of the variable displacement hydraulic machine, can be controlled by controlling the volume flow intake of the variable displacement hydraulic machine. The volume flow intake of the variable displacement hydraulic machine, in turn, can be controlled for instance by adjusting the displacement of the variable displacement hydraulic machine. The speed of the variable displacement hydraulic machine or a rotatable load driven by it may be controlled for instance by the closed loop speed control described above.

In the description above, proportionality and dependency refer to such proportionality and dependency between two different variables, functions or factors which can be represented by means of, for example, a mathematical relation or function. Alternatively, or in addition, said proportionality or dependency refers to a connection or interdependence between the two different variables, functions or factors, whereby predetermined states of one variable, function or factor correspond to predetermined states of the other variable, function or factor. In this way, one variable, function or factor may be used to control the other variable, function or factor, to make the system according to the presented solution operate in a targeted way.

The presented solution is not limited merely to the alternatives, examples and embodiments which have been presented above and which should not be considered the sole embodiments of the solution. In the presented solution, it is also possible to apply the above presented alternatives, examples and embodiments in combination, for implementing the aims presented above.

The implementation of the solution presented will be defined in more detail in the appended claims.

The invention claimed is:

1. A hydraulic system for driving a rotatable load, the hydraulic system comprising:
- a high-pressure line for hydraulic fluid;
- a pump configured to supply pressurized hydraulic fluid to the high-pressure line;
- a variable displacement hydraulic machine connected by a fluid connection to the high-pressure line for rotationally driving the rotatable load;
- an electronic control unit;
- an energy storing device connected to the high-pressure line and configured to communicate with the high-pressure line by receiving energy from the high-pressure line and/or supplying energy to the high-pressure line; and a first detector configured to detect the amount of energy stored in the energy storing device and to transmit a signal indicating said amount of energy stored to the electronic control unit;

wherein the electronic control unit is configured to control a volume flow intake of the variable displacement hydraulic machine dependent on a target output of the variable displacement hydraulic machine and on the detected amount of energy stored in the energy storing device, wherein the electronic control unit is configured to control the volume flow intake of the variable displacement hydraulic machine dependent on the target output of the variable displacement hydraulic machine and on the detected amount of energy stored in the energy storing device in such a manner, that when the amount of energy stored in the energy storing device exceeds an upper control limit of the amount of energy stored in the energy storing device, the volume flow intake of the variable displacement hydraulic machine is controlled dependent on the target output of the variable displacement hydraulic machine only, when the amount of energy stored in the energy storing device goes below a lower control limit of the amount of energy stored in the energy storing device, the volume flow intake of the variable displacement hydraulic machine is controlled to be limited to the volume flow supplied by the pump to the variable displacement hydraulic machine, and when the amount of energy stored in the energy storing device goes below the upper control limit of the amount of energy stored in the energy storing device but exceeds the lower control limit of the amount of energy stored in the energy storing device, the volume flow intake of the variable displacement hydraulic machine is controlled dependent on the target output of the variable displacement hydraulic machine and the detected amount of energy stored in the energy storing device, such that the volume flow intake of the variable displacement hydraulic machine exceeds the volume flow supplied by the pump to the variable displacement hydraulic machine by an amount dependent on the amount of energy stored in the energy storing device.

2. The hydraulic system according to claim 1, wherein the volume flow intake of the variable displacement hydraulic machine is controlled by controlling the displacement of the variable displacement hydraulic machine.

3. The hydraulic system according to claim 2, wherein the electronic control unit is configured to control the volume flow intake of the variable displacement hydraulic machine by controlling the displacement of the variable displacement hydraulic machine when the amount of energy stored in the energy storing device is equal to or lower than a predetermined upper control limit.

4. The hydraulic system according to claim 2, wherein said controlling of the volume flow intake of the variable displacement hydraulic machine comprises controlling the volume flow intake of the variable displacement hydraulic machine to a predetermined maximum variable displacement hydraulic machine volume flow intake, and wherein the predetermined maximum variable displacement hydraulic machine volume flow intake is reduced in response to a reduction in the amount of energy stored in the energy storing device.

5. The hydraulic system according to claim 2, wherein said displacement of the variable displacement hydraulic machine is controlled to be reduced in response to an increase in the rotational speed of the variable displacement hydraulic machine.

6. The hydraulic system according to claim 1, wherein the pump is configured to supply a predetermined maximum pump volume flow intake of the variable displacement hydraulic machine; and wherein the electronic control unit is configured to adjust the volume flow intake of the variable displacement hydraulic machine to be, at its highest, equal to a predetermined maximum variable displacement hydraulic machine volume flow which is proportional to said maximum pump volume flow intake of the variable displacement hydraulic machine.

7. The hydraulic system according claim 1, wherein the energy storing device comprises a pressure accumulator, and wherein receiving energy from the high-pressure line comprises receiving pressurized hydraulic fluid from the high-pressure line into the pressure accumulator, and wherein supplying energy to the high-pressure line comprises supplying pressurized hydraulic fluid to the high-pressure line.

8. The hydraulic system according to claim 7, wherein the energy storing device comprises a pressure accumulator and wherein the electronic control unit is configured to control the volume flow intake of the variable displacement hydraulic machine to a maximum variable displacement hydraulic machine volume flow, wherein the maximum variable displacement hydraulic machine volume flow is dependent of both the amount of the pressurized hydraulic fluid in the pressure accumulator and the pressure of the pressurized hydraulic fluid in the pressure accumulator.

9. The hydraulic system according to claim 8, wherein the electronic control unit is configured to control the volume flow intake of the variable displacement hydraulic machine to a maximum variable displacement hydraulic machine volume flow dependent on the amount and pressure of pressurized fluid in the pressure accumulator, and also dependent on a power intake of the variable displacement hydraulic machine.

10. The hydraulic system according to claim 1, wherein the hydraulic system further comprises a valve device configured to control the volume flow of pressurized hydraulic fluid from the high-pressure line to the variable displacement hydraulic machine.

11. The hydraulic system according to claim 1, wherein the hydraulic system further comprises a valve device configured to control the rotational speed of the variable displacement hydraulic machine.

12. The hydraulic system according to claim 1, wherein the hydraulic system further comprises at least one setting device configured to generate a setting signal and wherein the electronic control unit is configured to determine the target output of the variable displacement hydraulic machine dependent on the setting signal.

13. The hydraulic system according to claim 12, wherein the at least one setting device comprises a control device which is a manually controllable control stick.

14. The hydraulic system according to claim 12, wherein the at least one setting device comprises a control device connected to the electronic control unit, configured to generate said setting signal, and configured to set a control signal to be indicative of the position of the control device.

15. The hydraulic system according to claim 1, wherein the first detector comprises a sensor configured to measure the amount of energy stored in the energy storing device indirectly.

16. The hydraulic system according to claim 15, wherein the sensor is configured to measure the pressure of hydraulic fluid contained in the high-pressure line and is configured to transmit a measurement signal indicative to said pressure of the hydraulic fluid, to the electronic control unit of the hydraulic system.

17. The hydraulic system according to claim 1, wherein the first detector comprises a sensor configured to measure the amount of energy stored in the energy storing device directly.

18. The hydraulic system according to claim 17, wherein the energy storing device comprises a pressure accumulator and wherein the sensor is connected to the pressure accumulator and configured to measure an amount of hydraulic fluid in the pressure accumulator, and is configured to transmit a measurement signal indicative to said amount of the hydraulic fluid, to the electronic control unit of the hydraulic system.

19. The hydraulic system according to claim 1, wherein a dependency between the volume flow intake of the variable displacement hydraulic machine is monotonically decreasing, when the amount of energy stored in the energy storing device goes below the upper control limit of the amount of energy stored in the energy storing device but exceeds the lower control limit of the amount of energy stored in the energy storing device.

* * * * *